US008611474B2

(12) United States Patent
Budianu et al.

(10) Patent No.: US 8,611,474 B2
(45) Date of Patent: Dec. 17, 2013

(54) SYSTEM AND METHOD FOR DETECTING AND PROCESSING RECEIVED SIGNAL WITH PULSE SEQUENCE

(75) Inventors: Petru C. Budianu, San Diego, CA (US); Jun Shi, San Diego, CA (US); Amal Ekbal, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 597 days.

(21) Appl. No.: 12/766,361

(22) Filed: Apr. 23, 2010

(65) Prior Publication Data

US 2011/0261862 A1 Oct. 27, 2011

(51) Int. Cl.
*H03D 1/00* (2006.01)
*H04L 27/06* (2006.01)

(52) U.S. Cl.
USPC .......................................... 375/343; 375/340

(58) Field of Classification Search
USPC ......... 375/316, 343, 340, 354, 355, 371, 373, 375/376
See application file for complete search history.

(56) References Cited

U.S. PATENT DOCUMENTS

| | | | | |
|---|---|---|---|---|
| 3,961,171 | A * | 6/1976 | Freeman | 708/212 |
| 5,598,429 | A * | 1/1997 | Marshall | 375/149 |
| 6,160,821 | A * | 12/2000 | Dolle et al. | 370/509 |
| 6,643,336 | B1 * | 11/2003 | Hsieh et al. | 375/343 |
| 7,463,709 | B2 * | 12/2008 | Raphaeli et al. | 375/366 |
| 7,627,067 | B2 * | 12/2009 | Coulson | 375/362 |
| 2002/0126618 | A1 * | 9/2002 | Kim | 370/208 |
| 2004/0005022 | A1 * | 1/2004 | Zhu et al. | 375/365 |
| 2004/0240597 | A1 * | 12/2004 | Cattaneo et al. | 375/354 |
| 2005/0185743 | A1 * | 8/2005 | Li | 375/350 |
| 2006/0093077 | A1 | 5/2006 | El Fawal et al. | |

(Continued)

FOREIGN PATENT DOCUMENTS

| | | |
|---|---|---|
| EP | 1298812 A1 | 4/2003 |
| EP | 1298812 A1 | 4/2003 |
| EP | 1873924 A1 | 1/2008 |
| EP | 1873924 A1 | 1/2008 |
| GB | 2404122 A | 1/2005 |

OTHER PUBLICATIONS

Reggiani L et al: "A reduced-complexity acquisition algorithm for UWB impulse radio", Ultra Wideband Systems and Technologies, 2003 IEEE Conference on Nov. 16-19, 2003, Piscataway, NJ, USA,IEEE, Nov. 16, 2003, pp. 131-135, XP010683743.

(Continued)

*Primary Examiner* — Tesfaldet Bocure
(74) *Attorney, Agent, or Firm* — Paul S. Holdaway

(57) ABSTRACT

Methods of detecting a pulse sequence in a received signal are disclosed, each of which entails operating on samples of the received signal. One method entails determining a correlation of samples with a reference sequence, and detecting the pulse sequence based on the correlation. Another method entails selecting a reference sample associated with a pulse, and detecting the pulse sequence by analyzing samples based on one or more lengths of a time hopping interval and the reference sample. Another method entails selecting a reference sample associated with non-restricted time hopping intervals, and detecting the pulse sequence by analyzing samples that are based on substantially one or more lengths of a half pulse interval and the reference sample. Further, disclosed is a method of determining a timing drift by selecting samples, determining a time delay between the selected samples, and determining the timing drift based on the determined time delay and an expected time delay.

61 Claims, 12 Drawing Sheets

(56) References Cited

U.S. PATENT DOCUMENTS

| | | | |
|---|---|---|---|
| 2006/0227750 A1* | 10/2006 | Soltanian et al. | 370/335 |
| 2007/0019751 A1* | 1/2007 | Fanson et al. | 375/260 |
| 2007/0217524 A1* | 9/2007 | Wang et al. | 375/260 |
| 2009/0252261 A1* | 10/2009 | Wu et al. | 375/343 |
| 2010/0086073 A1 | 4/2010 | Jia et al. | |
| 2011/0002366 A1* | 1/2011 | Michaels et al. | 375/148 |
| 2011/0019817 A1* | 1/2011 | Michaels et al. | 380/38 |

OTHER PUBLICATIONS

International Search Report & Written Opinion—PCT/US2011/033675, International Search Authority—European Patent Office—Sep. 29, 2009.

Kamoun M et al: "Impact of desynchronization on PPM UWB systems: a capacity based approach", Information Theory Workshop, 2004. IEEE San Antonio, TX, USA Oct. 24-29, 2004, Piscataway, NJ, USA,IEEE, Oct. 24, 2004, pp. 198-203, XP010776136.

Reggiani L et al: "A reduced-complexity acquisition algorithm for UWB impulse radio", Ultra Wideband Systems and Technologies, 2003 IEEE Conference on Nov. 16-19, 2003, Piscataway, NJ, USA, IEEE, Nov. 16, 2003, pp. 131-135, XP010683743.

Tiziano Bianchi et al: "SPCp1-09: Comparison of Pulse Repetition and Cyclic Prefix Communication Techniques for Impulse Radio UWB Systems", Global Telecommunications Conference, 2006. GLOBECOM '06. IEEE, IEEE, PI, Nov. 1, 2006, pp. 1-5, XP031075613.

\* cited by examiner

SYSTEM AND METHOD FOR DETECTING AND PROCESSING RECEIVED SIGNAL WITH PULSE SEQUENCE

FIELD

The present disclosure relates generally to communication systems, and in particular, to a system and method for detecting and processing a received signal including one or more pulse sequences.

BACKGROUND

In communication systems, signals are often transmitted from a source communication device to a target communication device via a wireless medium. These communication devices typically employ a transmitter for transmitting signals long distances via the wireless medium. In many cases, the transmitter is operated continuously, whether or not signals are being transmitted. In some cases, operating a transmitter in a continuous manner may be acceptable. However, in other cases, especially when the power source is limited, it may not be desirable since the communication device may not be operated continuously for a long time.

For instance, many communication devices are portable, such as cellular telephones, personal digital assistants (PDAs), handheld products, and other devices. Portable communication devices typically rely on a limited power source, such as a battery, to perform the various intended operations. A limited power source typically has a continuous use life that depends on the amount of power used by the portable device. It is generally desirable to extend the continuous use life as much as possible. Accordingly, portable communication devices are more frequently designed to consume less and less power.

One technique for operating a transmitter in a more power efficient manner is to use pulse-based modulation techniques (e.g., pulse-position modulation) to transmit signals. In such systems, a transmitter may be operated in a relatively high power consumption mode during the transmission of a pulse signal. However, when the transmitter is not being used to transmit the pulse signal, it is operated in a relatively low power consumption mode in order to conserve power. Similarly, in such systems, a receiver may be operated in a relatively high power consumption during the reception of the pulse signal, and operated in a relatively low power consumption mode when not receiving the signal.

In order for the receiver to know when pulses are expected to arrive, techniques for synchronizing the transmission of the pulse signal between the transmitter and receiver are typically employed. One such technique is for the transmitter to transmit pulse sequences to the receiver, which has a priori knowledge of the sequences. If the pulse sequences are transmitted in an a priori manner, the reception of the signals may be synchronized with the transmission of the signals. This allows the receiver to know when pulses are expected to be received and not received, and thus may operate in the relatively high and low power modes accordingly. The detection and processing of such pulse sequences are disclosed herein.

SUMMARY

An aspect of the disclosure relates to a method of detecting one or more pulse sequences in a first signal. In one aspect, the method comprises receiving the first signal, generating a plurality of samples based on the first signal, determining a correlation of the samples with a second signal based on a reference sequence, and detecting the one or more pulse sequences based on the correlation. In another aspect, the determining the correlation of the samples with the second signal comprises performing a circular convolution of the samples with the second signal. In yet another aspect, the reference sequence comprises asserted windows arranged in substantially the same manner as pulses of the one or more pulse sequences in the first signal. In still another aspect, the second signal comprises asserted windows each having a width spanning a plurality of the generated samples.

According to another aspect, the method further comprises setting the width of each asserted window based on at least one characteristic (e.g., a signal-to-interference-plus-noise ratio (SINR)) of the first signal. In still another aspect, the method further comprises setting the width of each asserted window based on a timing drift between a first clock associated with a transmission of the first signal and a second clock associated with the reception of the first signal. In yet another aspect, the method further comprises setting the width of each asserted window based on a jitter of a clock associated with the reception of the first signal. In another aspect, the pulses in the pulse sequence in the first signal comprise ultra-wideband (UWB) pulses.

Another aspect of the disclosure relates to a method of correlating the samples of the first signal with the second signal. In one aspect, the method comprises determining a first sample from the plurality of generated samples that is associated with a pulse of the one or more pulse sequences in the first signal, and correlating samples from the plurality of generated samples with the second signal based on substantially one or more lengths of a time hopping interval associated with the first signal and the first sample. In another aspect, the method further comprises selecting a second sample from the plurality of generated samples, and determining an offset between the first sample and the second sample, wherein correlating samples from the plurality of samples with the second signal is based on the offset. In still another aspect, correlating samples from the plurality of generated samples with the second signal comprises correlating samples that are substantially the offset plus one or more lengths of the time hopping interval from the second sample. Additionally, in another aspect, correlating samples from the plurality of generated samples with the second signal comprises correlating other samples from the plurality of samples based on substantially one or more lengths of the time hopping interval and a second sample distinct from the first sample.

Another aspect of the disclosure relates to a method of correlating the samples of the first signal with the second signal. In one aspect, the method comprises determining samples from the plurality of generated samples that are associated with one or more non-restricted time hopping intervals within a half pulse interval associated with the first signal that comprises one or more restricted time hopping intervals, and correlating samples from the plurality of generated samples based on substantially one or more lengths of a half pulse interval and the determined samples. In another aspect, the step of determining samples associated with one or more time hopping intervals comprises selecting a reference sample from the plurality of generated samples, determining one or more offsets based on the reference sample and samples associated with the one or more time hopping intervals, respectively, and determining samples that are not associated with the one or more offsets. In yet another aspect, the step of determining samples associated with one or more non-restricted time hopping intervals comprises selecting a reference sample of the received signal, determining one or more offsets based on the reference sample and samples associated with one or more non-restricted time hopping intervals, respectively, and determining samples that are associated with the one or more offsets.

Another aspect of the disclosure relates to a method of determining a timing drift associated with the first signal. In one aspect, the method comprises selecting a first set of samples from the plurality of generated samples, selecting a second set of samples from the plurality of generated samples, determining a time delay based on the first and second sets of samples, and determining the timing drift based on the determined time delay and an expected time delay. In another aspect, the timing drift may be used for synchronization with the first signal. In still another aspect, the first and second sets of samples are associated with first and second pulse sequences in the first signal, respectively.

In another aspect, the method further comprises selecting a reference sample from the plurality of generated samples, determining a first offset based on the reference sample and the first set of samples, and determining a second offset based on the reference sample and the second set of samples, wherein the time delay between the first and second sets of samples is determined based on the first and second offsets. In yet another aspect, the expected time delay is based on a clock signal associated with the reception of the first signal. In still another aspect, the first and second sets of samples have substantially the same indices within the first and second pulse sequences, respectively. In another aspect, the one or more pulse sequences in the first signal comprise a pulse sequence repeated one or more times.

Other aspects, advantages and novel features of the present disclosure will become apparent from the following detailed description of the disclosure when considered in conjunction with the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1A:
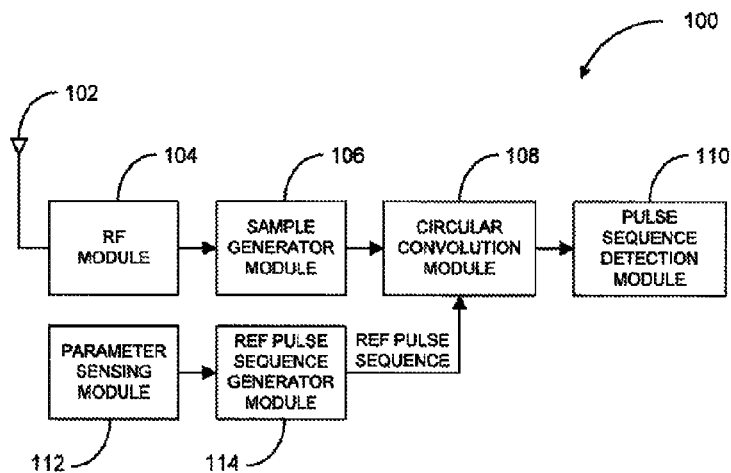
FIG. 1A illustrates a block diagram of an exemplary receiver in accordance with an aspect of the disclosure.

FIG. 1A illustrates a block diagram of an exemplary receiver 100 in accordance with an aspect of the disclosure. In summary, the receiver 100 is adapted to detect one or more pulse sequences in a received signal. The receiver 100 performs the detection by performing a circular convolution of samples of the received signal with a signal based on a reference sequence. The reference sequence may comprise asserted windows arranged in substantially the same manner as the pulses of the one or more pulse sequences in the received signal. As discussed in more detail below, the receiver 100 detects the one or more pulse sequences in the received signal when the correlation between the received signal samples and the reference sequence signal based on the circular convolution is substantially maximized. Once the receiver 100 has detected the one or more pulse sequences, it is synchronized with the reception of the received signal, and thus may operate in a relatively high power consumption mode when pulses in the received signal are expected, and in a relatively low power consumption mode when pulses are not expected.

In particular, the receiver 100 comprises an antenna 102, a radio frequency (RF) module 104, a sample generator module 106, a circular convolution module 108, a pulse sequence detection module 110, a parameter sensing module 112, and a reference pulse sequence generator module 114. The antenna 102 picks up the received signal from the wireless medium, which as discussed above, may include one or more pulse sequences. The RF module 104 processes (e.g., amplifies, filters, downconverts, etc.) the received signal. The sample generator module 106 generates samples of the received signal. The reference pulse sequence generator module 114 generates a signal based on a reference sequence which, in turn, may be based on a signal generated by the parameter sensing module 112. As discussed in more detail below, the width (in terms of samples) of asserted windows of the reference sequence may be based on one more parameters detected, sensed or determined by the parameter sensing module 112.

As explained in more detail below, the circular convolution module 108 performs a circular convolution of the received signal samples with a signal based on a reference sequence. The reference sequence may comprise asserted windows arranged in substantially the same as the pulses of the one or more pulse sequences in the received signal. The signal generated by the circular convolution module 108 indicates a correlation between the pulse sequence in the received signal and the reference sequence signal. When the correlation is substantially maximized, the reference sequence signal is substantially time aligned with the pulse sequence in the received signal. The pulse sequence detection module 110 monitors the correlation signal generated by the circular convolution module 108, and when it is substantially maximized, the module 110 is able to detect the pulse sequence in the received signal because it is substantially aligned with the reference sequence signal.

Figure 1B:
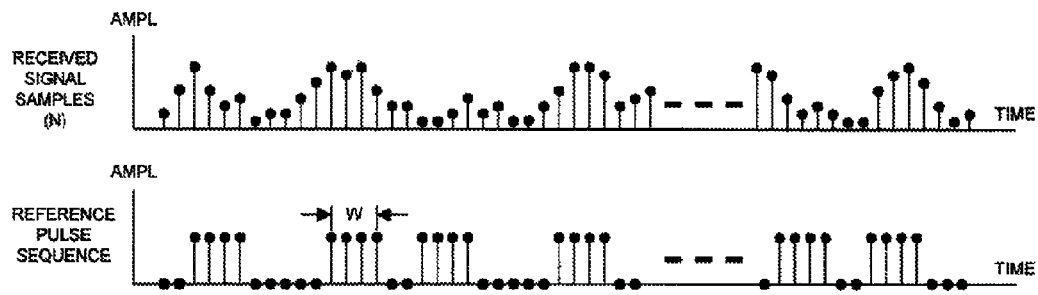
FIG. 1B illustrates a signal diagram of an exemplary received signal and a reference pulse sequence in accordance with another aspect of the disclosure.

FIG. 1B illustrates a diagram of exemplary received signal and a reference sequence signal in accordance with another aspect of the disclosure. The top signal diagram is an example of samples of the received signal. As discussed above, the received signal, which includes one or more pulse sequences (e.g., repeated pulse sequences), is sampled by the sample generator module 106. As an example, each pulse sequence may include 64 pulses. Each pulse may be received in one of 16 time hopping intervals, eight (8) of which may be reserved to indicate a logic zero and the other eight (8) may indicate a logic one. The sample generator module 106 may generate 16 samples per each time hopping interval. Accordingly, for each pulse sequence, the sample generator module 106 may generate about 16 k samples (e.g., 64×16×16). It shall be understood that these values are merely examples, and each pulse sequence may be associated with more or less samples, and may be structured differently.

The bottom signal diagram is an example of a signal based on a reference sequence. The signal may comprise a plurality of asserted windows configured in time to have the same pattern as one or more pulse sequences in the received signal. Each asserted window of the reference sequence may have a width W that spans one or more samples of the received signal. For instance, in this example, the width W of each asserted window of the reference pulse sequence is four (4) samples wide. The width of each asserted window of the reference sequence may depend on different parameters, such as the signal-to-interference-plus-noise ratio (SINR) of the received signal, the timing drift between the clock of a transmitter associated with the transmission of the received signal and the clock of the receiver 100, and jitter of the clock of the receiver 100. Such parameters may be sensed, detected and/or measured by the parameter sensing module 112.

Figure 1C:
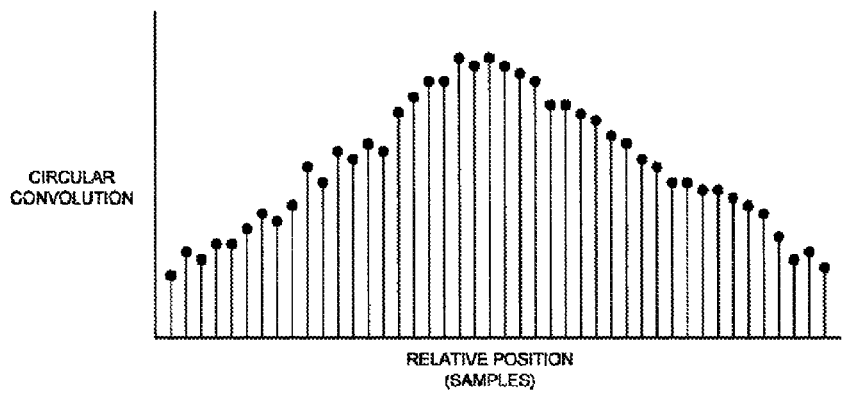
FIG. 1C illustrates a graph depicting an exemplary circular convolution of the received signal samples with the reference sequence in accordance with another aspect of the disclosure.

FIG. 1C illustrates a graph of an exemplary correlation between received signal samples and the signal based on the reference sequence in accordance with another aspect of the disclosure. According to the graph, the y- or vertical axis indicates the correlation between the received samples and the reference sequence signal based on the circular convolution operation, and the x- or horizontal axis indicates the relative positions of the samples with respect to the reference sequence signal. As the graph illustrates, the correlation will most likely have a maximum at a particular relative position of the samples with respect to the reference sequence signal. At such position, the reference pulse sequence may be substantially time aligned with one pulse sequence of the received signal. Thus, the pulse sequence detection module 110 may detect the one or more pulse sequence in the received signal by monitoring the correlation signal generated by the circular convolution module 108.

Figure 1D:
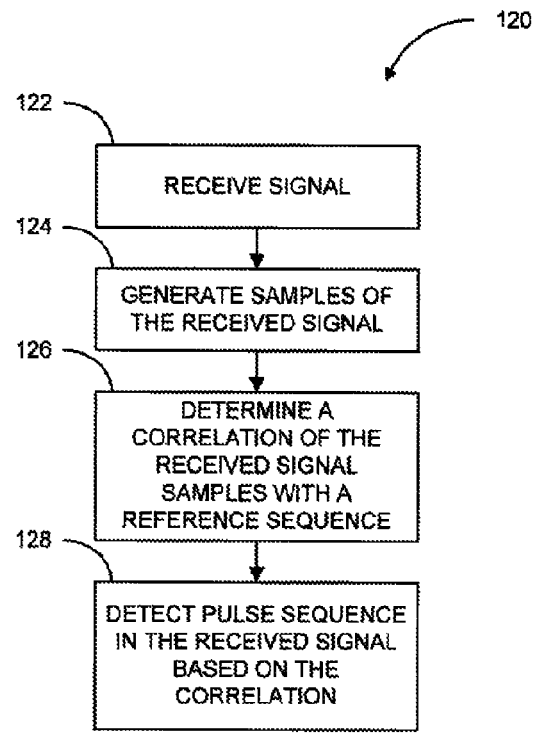
FIG. 1D illustrates a flow diagram of an exemplary method of detecting a pulse sequence in a received signal in accordance with another aspect of the disclosure.

FIG. 1D illustrates a flow diagram of an exemplary method 120 of detecting one or more pulse sequences in a received signal in accordance with another aspect of the disclosure. The method 120 may be implemented by the exemplary receiver 100 previously discussed, or another type of device. According to the method 120, the signal including the one or more pulse sequences are received (block 122). Then, samples of the received signal are generated (block 124). Then, the correlation is determined (e.g., by a circular convolution operation) of the received signal samples with a signal based on a reference sequence is performed (block 126). Then, the one or more pulse sequences in the received signal are detected based on the correlation (block 128).

Figure 1E:
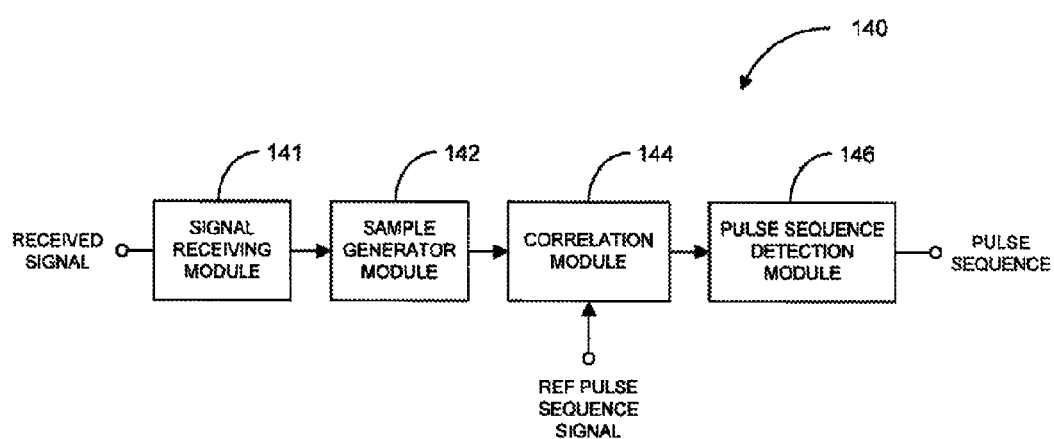
FIG. 1E illustrates a block diagram of an exemplary apparatus for detecting a pulse sequence in a received signal in accordance with another aspect of the disclosure.

FIG. 1E illustrates a block diagram of an exemplary apparatus 140 for detecting one or more pulse sequences in a received signal in accordance with another aspect of the disclosure. The apparatus 140 comprises a signal receiving module 141 adapted to receive a signal. The apparatus 140 further comprises a sample generator module 142 adapted to generate samples based on the received signal. The apparatus 140 further comprises a correlation module 144 adapted to perform a correlation of the received signal samples with a signal based on a reference sequence. The apparatus 140 additionally comprises a pulse sequence detection module 146 adapted to detect the one or more pulse sequences in the received signal based on the correlation performed by the correlation module 144.

Figure 2A:
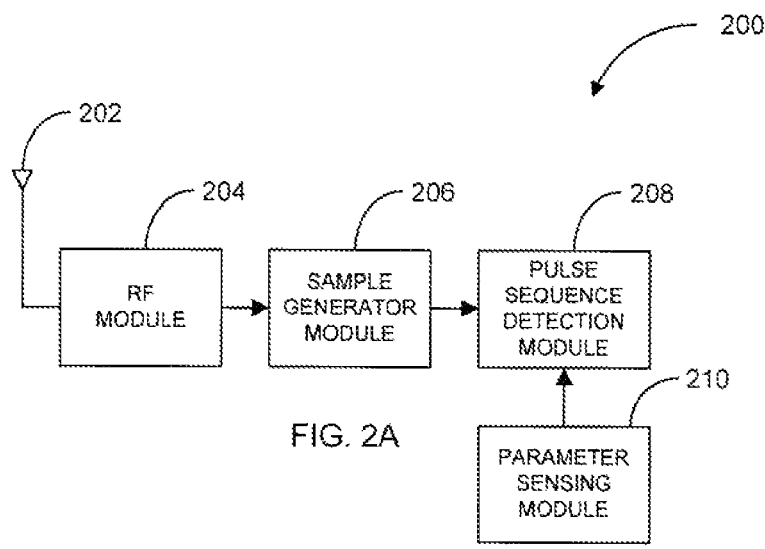
FIG. 2A illustrates a block diagram of an exemplary receiver in accordance with another aspect of the disclosure.

FIG. 2A illustrates a block diagram of an exemplary receiver 200 in accordance with another aspect of the disclosure. In summary, the receiver 200 is adapted to detect one or more pulse sequences in a received signal by only analyzing a subset of samples of the received signal. As discussed in more detail below, the receiver 200 is adapted to select the subset of samples for analysis (e.g., performing a correlation of the samples with a signal based on a reference sequence) based on a prediction of which samples are associated with pulses of the one or more pulse sequences. By only analyzing a subset of the samples, the receiver 200 may be able to detect one or more pulses in the received signal much faster and using less power.

In particular, the receiver 200 comprises an antenna 202, an RF module 204, a sample generator module 206, a pulse sequence detection module 208, and a parameter sensing module 210. The antenna 202 picks up the received signal from the wireless medium, which as discussed above, may include one or more pulse sequences. The RF module 204 processes (e.g., amplifies, filters, downconverts, etc.) the received signal. The sample generator module 206 generates samples of the processed received signal. As discussed in more detail below, the pulse sequence detection module 208 detects one or more pulse sequence by selecting a first sample associated with a pulse, and then analyzing samples based on one or more lengths of a time hopping interval from the first sample. The parameter sensing module 210 may be used to set the width (in terms of samples) of an asserted window used to detect the one or more samples associated with pulses.

Figure 2B:
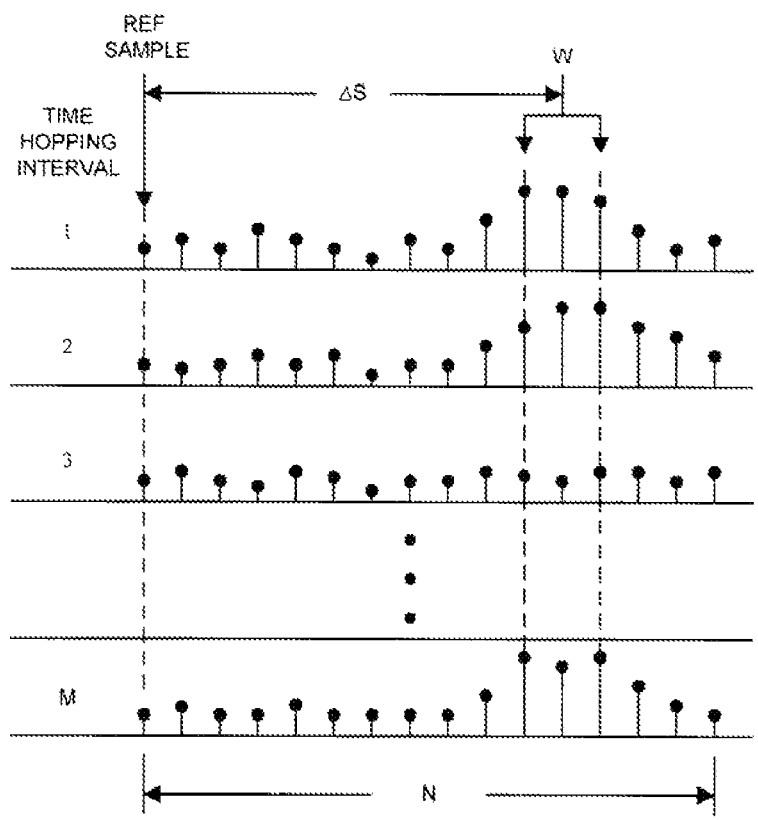
FIG. 2B illustrates a diagram of exemplary received signal in accordance with another aspect of the disclosure.

FIG. 2B illustrates a signal diagram of exemplary received signal in accordance with another aspect of the disclosure. As discussed above, each pulse sequence may include 64 pulses. Each pulse may be received in one of 16 time hopping intervals, eight (8) of which may be reserved to indicate a logic zero and the other eight (8) may be reserved to indicate a logic one. The sample generator module 206 may generate 16 samples per each time hopping interval. Accordingly, this signal diagram shows N samples (e.g., 16 samples) for each time hopping interval 1-M (e.g., M=16×64=1024).

In detecting the one or more pulse sequences in the received signal, the pulse sequence detection module 208 selects a reference sample, which could be done randomly or in another manner. For instance, in this example, the pulse sequence detection module 208 selects the first sample of time hopping interval 1. Then, the pulse sequence detection module 208 analyzes the subsequent samples N−1 in the corresponding time hopping interval (e.g., the next 15 samples) to determine whether one or more of such samples are associated with a pulse. For instance, in this example, the pulse sequence detection module 208 has determined that the $12^{th}$ sample of the corresponding time hopping interval is associated with a pulse.

The pulse sequence detection module 208 then determines the offset ΔS between the sample associated with the pulse (e.g., the $12^{th}$ sample) and the reference sample (e.g., the $1^{st}$ sample). In this example, the offset ΔS is 11 samples. The pulse sequence detection module 208 then analyzes the samples of the received signal based on the offset ΔS and one or more lengths of the time hopping interval N. For instance, the pulse sequence detection module 208 then analyzes the $12^{th}$ sample of time hopping interval 2, which is ΔS+N samples away from the reference sample. The pulse sequence detection module 208 then continues to analyze samples based on the $\Delta S+N_i$, where i extends from 1 to M−1. These are the samples that are most likely associated with a pulse.

The pulse sequence detection module 208 may search one or more samples around the samples of interest to determine whether they are associated with a pulse. The number of samples searched (e.g., the search or asserted window), designated herein as W, may depend on many distinct factors, such as the SINR of the received signal, the timing drift between the clock of a transmitter associated with the transmission of the signal and the clock of the receiver 200, and jitter of the clock of the receiver 200. Such parameters may be sensed, detected and/or measured by the parameter sensing module 210. Additionally, the pulse sequence detection module 208 may have to analyze samples of several time hopping intervals before it is able to select a reference sample. This may be the case where none of the samples within the corresponding time hopping interval is associated with a pulse. Once the pulse sequence detection module 208 detects the samples associated with the pulses, it is able to determine the pulse sequence in the received signal.

Figure 2C:
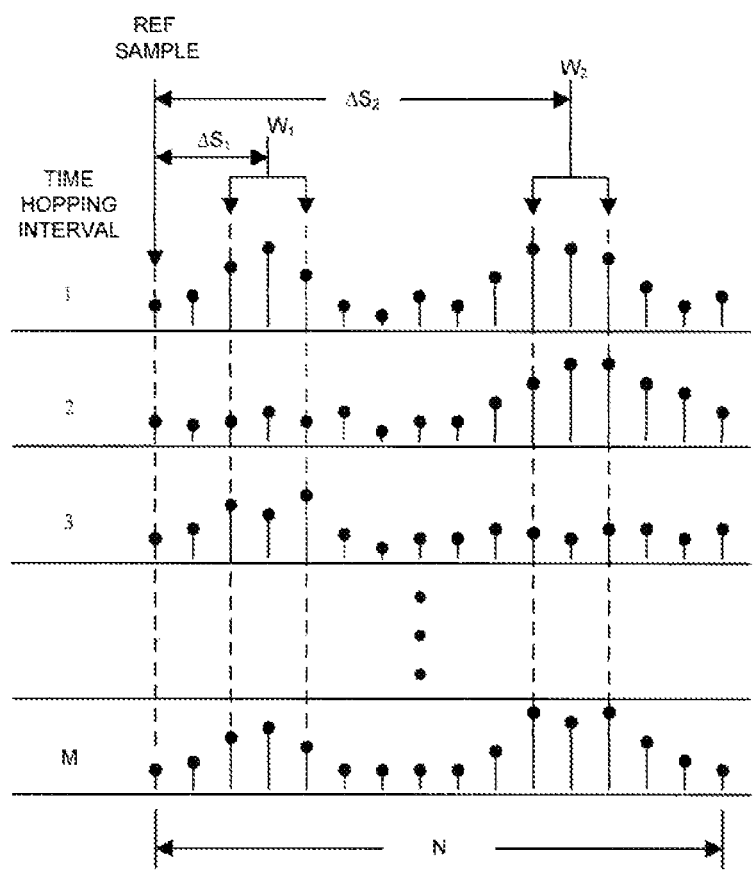
FIG. 2C illustrates a diagram of another exemplary received signal in accordance with another aspect of the disclosure.

FIG. 2C illustrates a diagram of another exemplary received signal samples in accordance with another aspect of the disclosure. In this example, the pulse sequence detection module 208 may select two different samples or two different sets of samples within a single time hopping interval that may be associated with a pulse. Thus, in this regards, the pulse sequence detection module 208 selects a reference sample. Then, the pulse sequence detection module 208 analyzes samples within the time hopping interval and finds a first sample that may be associated with a pulse, interference or noise. In this case, the first sample is offset from the reference sample by a first offset $\Delta S_1$, which in this example is the $4^{th}$ sample in the time hopping interval.

The pulse sequence detection module 208 may find another sample within the time hopping interval that may be associated with a pulse, interference or noise. In this case, the second sample is offset from the reference sample by a second offset $\Delta S_2$, which in this example is the $12^{th}$ sample in the time hopping interval. The pulse sequence detection module 208 then analyzes the samples of the received signal based on the first and offsets $\Delta S_1$ and $\Delta S_2$, and one or more lengths of the time hopping interval N. For instance, the pulse sequence detection module 208 then analyzes the $4^{th}$ and $12^{th}$ samples of time hopping interval 2, which is respectively $\Delta S_1+N$ and $\Delta S_2+N$ samples away from the reference sample. The pulse sequence detection module 208 then continues to analyze samples based on the $\Delta S+N_i$ and $\Delta S_2+N_i$, where i extends from 1 to M−1. These are the samples that are most likely associated with a pulse.

As discussed above, the pulse sequence detection module 208 may search one or more samples around the samples of interest to determine whether they are associated with a pulse. The number of samples searched around the first and second samples of interest (e.g., the search or asserted windows), designated herein as $W_1$ and $W_2$ (which may be the same or different), may depend on many distinct factors as discussed above. Once the pulse sequence detection module 208 detects the samples associated with the pulses, it is able to determine the pulse sequence in the received signal. As an example, the samples associated with the pulse sequence may be those pertaining to $\Delta S+N_i$ samples, and the samples associated with interference or noise may be those $S_2+N_i$, or vice-versa. The more samples analyzed within each time hopping interval, the likelihood that the pulse sequence will be detected increases. However, it will also consume more time and power to do so.

Figure 2D:
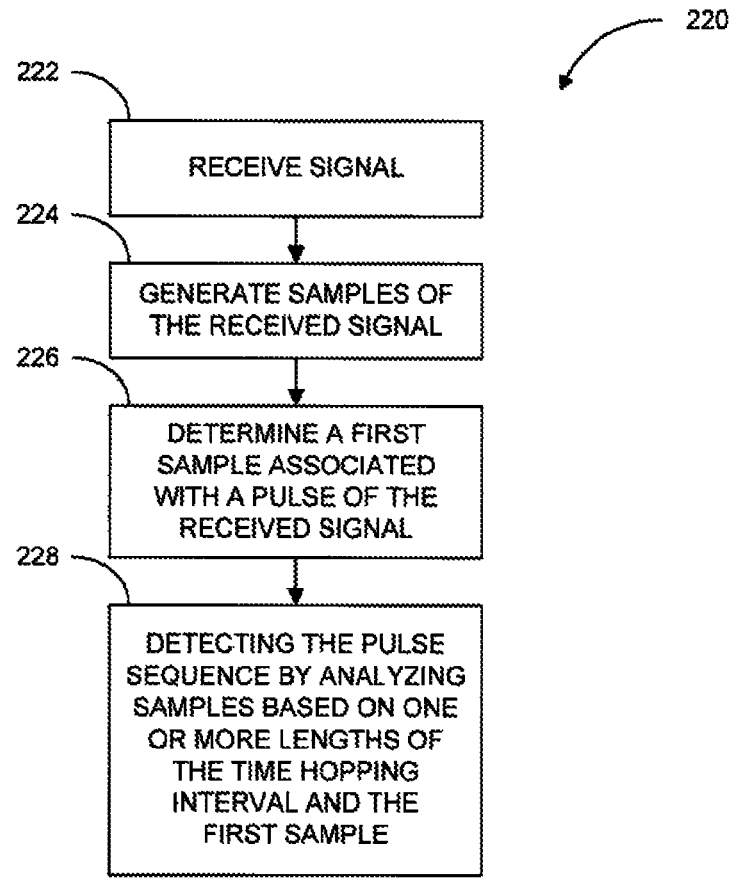
FIG. 2D illustrates a flow diagram of another exemplary method of detecting a pulse sequence in a received signal in accordance with another aspect of the disclosure.

FIG. 2D illustrates a flow diagram of another exemplary method 220 of detecting a pulse sequence in a received signal in accordance with another aspect of the disclosure. The method 220 may be implemented by the exemplary receiver 200 previously discussed, or another type of device. According to the method 220, a signal from a remote device is received (block 222). Then, the received signal is processed to generate samples of the received signal (block 224). Then, a first sample is determined that is associated with a pulse of the pulse sequence in the received signal (block 226). Then, pulses of the pulse sequence are detected by analyzing samples based substantially on one or more lengths of a time hopping interval and the first sample (block 228).

Figure 2E:
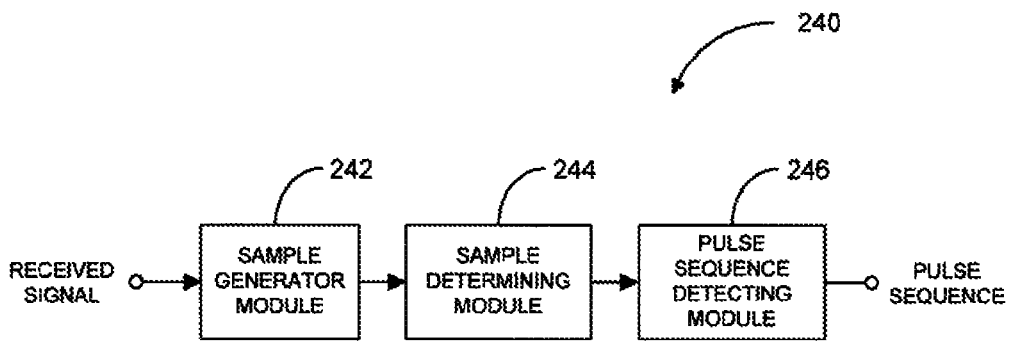
FIG. 2E illustrates a block diagram of another exemplary apparatus for detecting a pulse sequence in a received signal in accordance with another aspect of the disclosure.

FIG. 2E illustrates a block diagram of another exemplary apparatus 240 for detecting a pulse sequence in a received signal in accordance with another aspect of the disclosure. The apparatus 240 comprises a sample generator module 242 adapted to generate samples of the received signal. The apparatus 240 further comprises a sample determining module 244 adapted to determine a sample of the received signal associated with a pulse. And, the apparatus 240 comprises a pulse sequence detecting module 248 adapted to detect pulses of the pulse sequence by analyzing samples of the received signal based on substantially one or more lengths of a time hopping interval and the first sample.

Figure 3A:
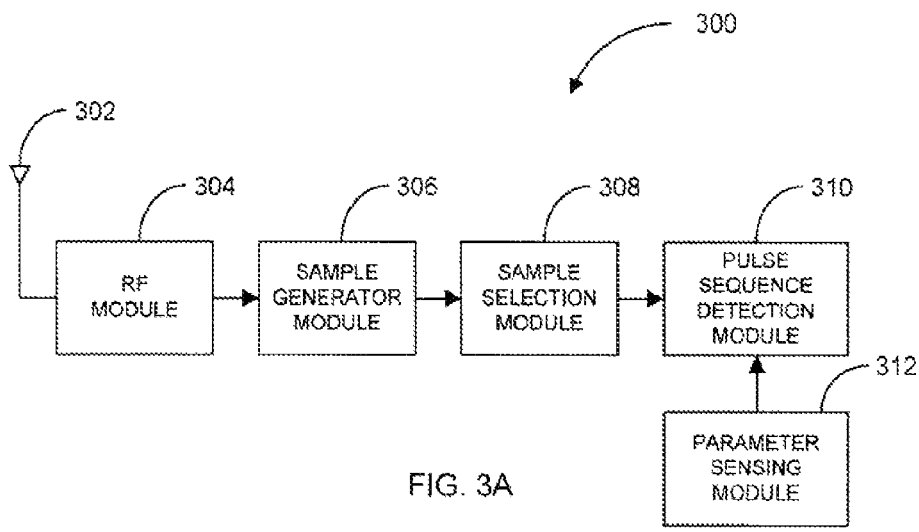
FIG. 3A illustrates a block diagram of an exemplary receiver in accordance with another aspect of the disclosure.

FIG. 3A illustrates a block diagram of an exemplary receiver 300 in accordance with another aspect of the disclosure. In summary, the receiver 300 is adapted to detect one or more pulse sequences in a received signal by only analyzing (e.g., performing a correlation of the samples with a signal based on a reference sequence) a subset of samples of the received signal. As discussed in more detail below, the receiver 300 is adapted to receive a signal with one or more pulse sequences, wherein the pulses of each sequence are restricted to a subset of the available time hopping intervals. This is typically termed in the relevant art as a restricted hopping sequence. By analyzing half pulse sequences, the restricted hopping intervals may be determined. The receiver 300 then only analyzes samples associated with time hopping intervals that are not the restricted (e.g., the non-restricted time hopping intervals).

In particular, the receiver 300 comprises an antenna 302, an RF module 304, a sample generator module 306, a sample selection module 308, a pulse sequence detection module 310, and a parameter sensing module 312. The antenna 302 picks up the received signal from the wireless medium, which as discussed above, may include one or more pulse sequences. The RF module 304 processes (e.g., amplifies, filters, downconverts, etc.) the received signal. The sample generator module 306 generates samples of the received signal. The sample selection module 308 selects samples associated with one or more non-restricted time hopping intervals among one or more restricted hopping intervals within a half pulse interval. As discussed in more detail below, the pulse sequence detection module 310 detects pulses of the pulse sequence by analyzing samples of the received signal based substantially on one or more lengths of the half pulse interval and the selected samples. The parameter sensing module 312 senses parameters which affect the analysis of the samples performed by the pulse sequence detection module 310.

Figure 3B:
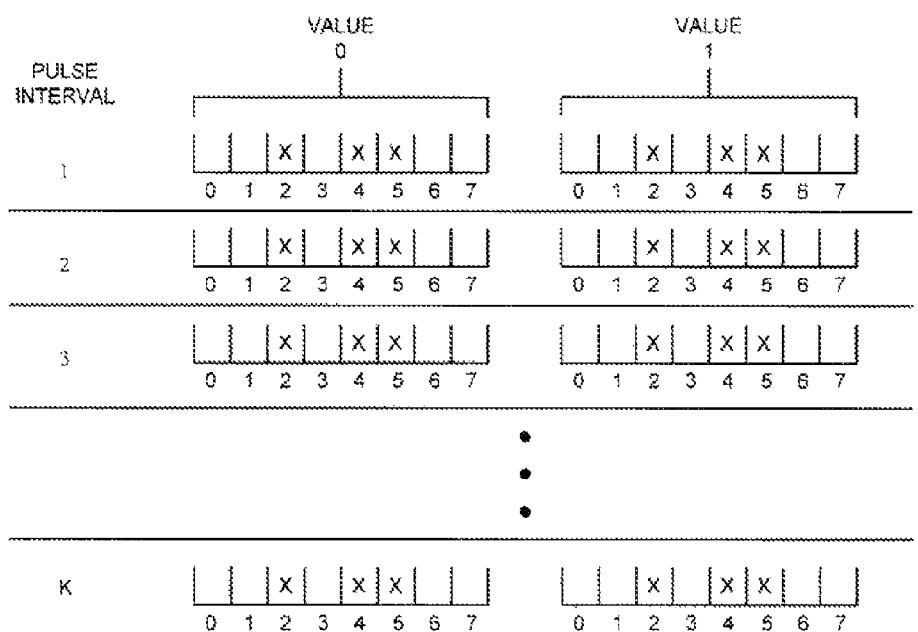
FIG. 3B illustrates a diagram of an exemplary pulse interval comprising restricted hopping pulse intervals in accordance with another aspect of the disclosure.

FIG. 3B illustrates a diagram of an exemplary pulse interval comprising restricted hopping pulse intervals in accordance with another aspect of the disclosure. In this example, each pulse interval includes 16 time hopping intervals. The first eight (8) time hopping intervals may be reserved to indicate a logic zero, and the second eight (8) time hopping intervals may be reserved to indicate a logic one. It shall be understood that this is merely an example, and the number of time hopping intervals per a pulse interval, as well as the number of intervals reserved to a logic zero and logic one may vary substantially. In this example, the time hopping intervals two (2), four (4) and five (5), noted with an X, are restricted hopping intervals, which means that no pulses should be transmitted or received within the restricted time hopping interval. As in the previous examples, the number K of pulse intervals in a pulse sequence may be 64, and the number of samples within one time hopping interval may be 16.

Figure 3C:
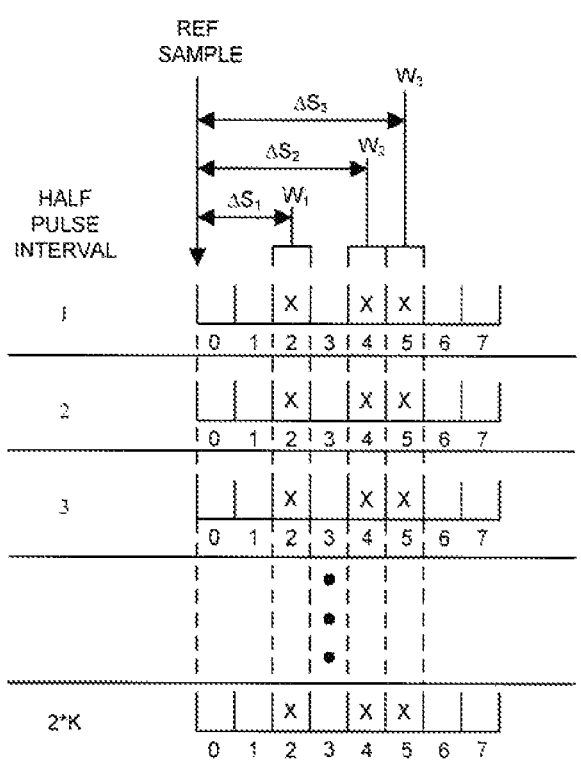
FIG. 3C illustrates a diagram relevant to an exemplary method of detecting a pulse sequence that includes one or more restricted hopping intervals in accordance with another aspect of the disclosure.

FIG. 3C illustrates a diagram relevant to an exemplary method of detecting a pulse sequence that includes one or more restricted hopping intervals in accordance with another aspect of the disclosure. According to the method, the sample selection module 308 selects a reference sample in a first half pulse interval (e.g., having a length of eight (8) time hopping intervals). Then, the sample selection module 308 analyzes samples within the first half pulse interval to determine one or more offsets associated with one or more restricted time hopping intervals, respectively. The sample selection module 308 may have to analyze a plurality of half pulse intervals in order to make the determination of the offsets associated with the one or more restricted hopping intervals. In this example, the sample selection module 308 has determined that the offsets associated with restricted hopping intervals two (2), four (4) and five (5) are $\Delta S_1$, $\Delta S_2$, and $\Delta S_3$, respectively.

Once the sample selection module 308 has determined the offsets associated with the restricted time hopping intervals, the pulse sequence detection module 310 detects the pulses of the pulse sequence by analyzing samples of the received signal based on one or more lengths of the half pulse interval (e.g., 128=16×8) and the offsets. For instance, the pulse sequence detection module 310 only analyzes samples within time hopping intervals zero (0), one (1), three (3), six (6), and seven (7) for each half pulse interval. Thus, the pulse sequence detection module analyzes samples of the received signal based on the samples or offsets associated with the non-restricted time hopping intervals. By only analyzing those samples to determine whether they are associated with pulses of the pulse sequence in the received signal, the pulse sequence detector 308 is able to detect the one or more pulse sequences much faster and with substantially less power consumption to do so.

Within each timing hopping interval that is searched, the pulse sequence detection module 310 may select only a subset of the samples pertaining to that interval. For example, the pulse sequence detection module 310 may employ the techniques of the previous embodiments to analyze samples likely to be associated with a pulse. The module 310 may further analyze additional samples within an asserted window around the sample of interest. The window may have a width W that spans one or more samples of the received signal. The width of the window may depend on different parameters, such as the signal-to-interference-plus-noise ratio (SINR) of the received signal, the timing drift between the clock of a transmitter associated with the transmission of the received signal and the clock of the receiver 300, and jitter of the clock of the receiver. Such parameters may be sensed, detected and/or measured by the parameter sensing module 312.

Figure 3D:
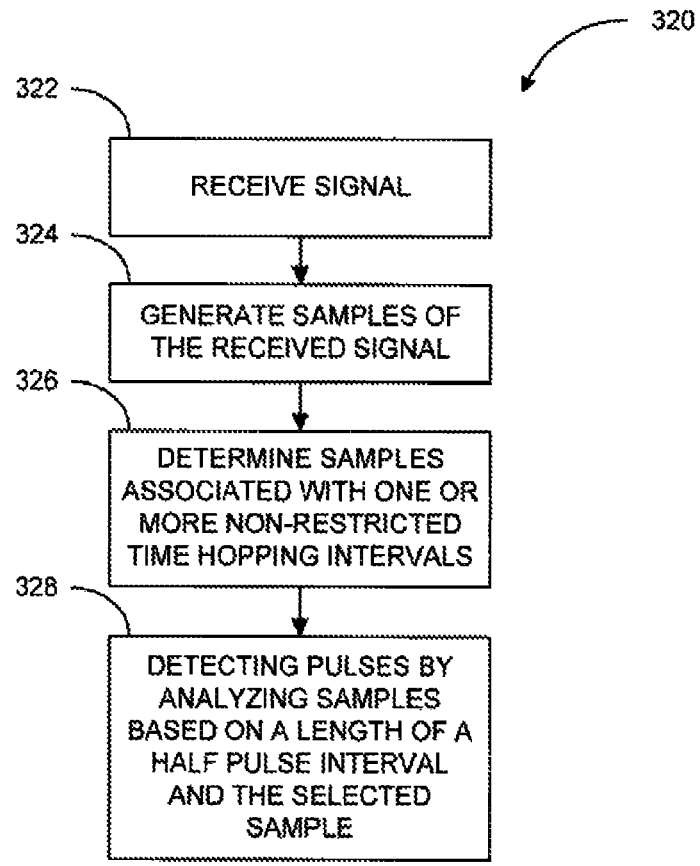
FIG. 3D illustrates a flow diagram of another exemplary method of detecting a pulse sequence in a received signal in accordance with another aspect of the disclosure.

FIG. 3D illustrates a flow diagram of another exemplary method 320 of detecting a pulse sequence in accordance with another aspect of the disclosure. The method 320 may be implemented by the receiver 300 discussed above or by another type of device. According to the method 320, a signal from a remote device is received (block 322). Then, the received signal is processed to generate samples of the received signal (block 324). Then, one or more samples associated with one or more non-restricted time hopping intervals are determined (block 326). Then, the pulses of the sequence are detected by analyzing samples based on substantially one or more lengths of a half pulse interval and the determined one or more samples (block 328).

Figure 3E:
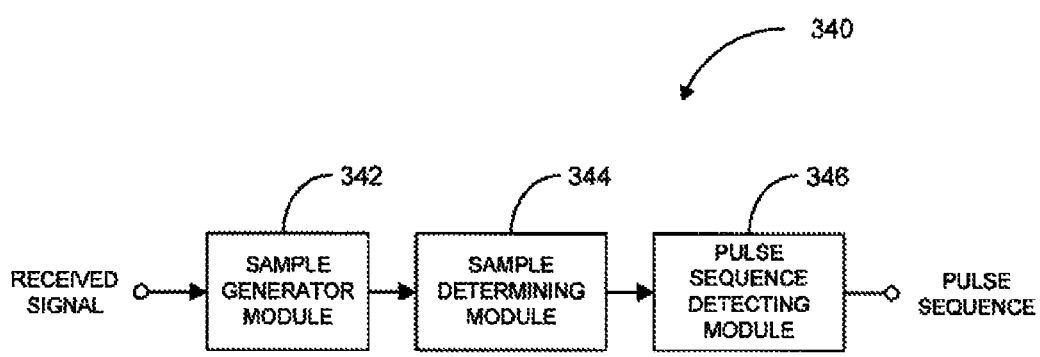
FIG. 3E illustrates a block diagram of another exemplary apparatus for detecting a pulse sequence in a received signal in accordance with another aspect of the disclosure.

FIG. 3E illustrates a block diagram of another exemplary apparatus 340 of detecting a pulse sequence in accordance with another aspect of the disclosure. The apparatus 340 comprises a sample generator module 342 adapted to generate samples of a received signal. The apparatus 340 further comprises a sample determining module 344 adapted to determine one or more samples associated with one or more non-restricted time hopping intervals within a half pulse interval. Additionally, the apparatus 340 comprises a pulse sequence detecting module 346 adapted to analyze samples of the received signal based on one or more lengths of a half pulse interval and the one or more determined samples.

Figure 4A:
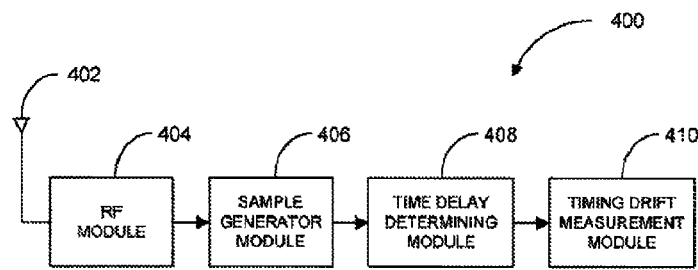
FIG. 4A illustrates a block diagram of another exemplary receiver in accordance with another aspect of the disclosure.

FIG. 4A illustrates a block diagram of another exemplary receiver 400 in accordance with another aspect of the disclosure. In summary, the receiver 400 is adapted to determine a the timing drift between the rate of the clock used to transmit pulses of the received signal, and the rate of the clock used to estimate the arrival of the pulses of the received signal.

Because these are two different clocks present in distinct device (e.g., a transmitter and a receiver), they often operate at different rates. In order for the receiver 400 to determine when pulses are expected so that it can operate in a relatively high power consumption mode when pulses are expected and operate in a relatively low power consumption mode when pulses are not expected, the receiver 400 should know the timing drift in the clocks so that it can synchronize with the received signal.

The receiver 400 determines the timing drift by receiving the signal, generating samples of the received signal, and selecting a reference sample among the samples of the received signal. The receiver 400 then determines a timing delay between two pulse sequences in the received signal by determining a first offset between the reference sample and a first set of samples associated with a first pulse sequence, and determining a second offset between the reference sample and a second set of samples associated with a second pulse sequence, wherein the timing delay is based on the first and second offsets. The receiver 400 then determines the timing drift associated with the signal based on the determined time delay and an expected time delay.

In particular, the receiver 400 comprises an antenna 402, an RF module 404, a sample generator module 406, a time delay determining module 408, and a timing drift measurement module 410. The antenna 402 picks up the received signal from the wireless medium, which as discussed above, may include pulse sequences. The RF module 404 processes (e.g., amplifies, filters, downconverts, etc.) the received signal. The sample generator module 406 generates samples of the processed received signal. The time delay determining module 408 determines a time delay between two samples associated with the first and second pulse sequences, respectively. It performs this by selecting a reference sample from among the samples of the received signal, determining a first offset between the reference sample and a first set of samples of the first pulse sequence, determining a second offset between the reference sample and a second set of samples of the second pulse sequence, and determining a time delay based on the first and second offsets. The timing drift measurement module 410 determines the timing drift associated with the received signal based on the determined time delay and an expected time delay. This is further discussed in more detail in connection with the following example.

Figure 4B:
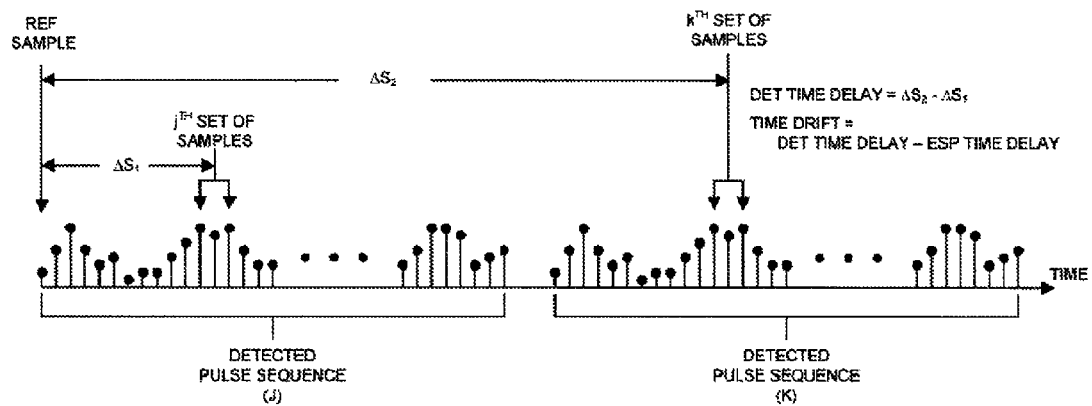
FIG. 4B illustrates a diagram of an exemplary received signal including pulse sequences in accordance with another aspect of the disclosure.

FIG. 4B illustrates a diagram of exemplary received signal including pulse sequences in accordance with another aspect of the disclosure. The diagram shows samples associated with a first detected pulse sequence designated herein as pulse sequence J. The diagram also shows samples associated with a second detected pulse sequence designated as pulse sequence K. In this example, the pulse sequences J and K are shown to be consecutive, although they need not be. Further, in accordance with this example, the time delay determining module 408 selects a reference sample, which in this case is the first sample associated with the first detected pulse sequence J. It shall be understood that the time delay determining module 408 may select any sample of the received signal to be the reference, including another sample of the first detected pulse sequence J, a sample of the second detected pulse sequence K, or a sample not associated with the first and second detected pulse sequences J and K.

Then, the time delay determining module 408 determines a first offset $\Delta S_1$, in terms of samples, between the reference sample and a jth set of samples of the first detected pulse sequence J. The jth set of sample may be selected randomly or in another manner. The time delay determining module 408 also determines a second offset $\Delta S_2$ between the reference sample and a kth set of samples of the second detected pulse sequence K. The kth set of samples may also be selected randomly or in another manner. As an example, the jth and kth sets of samples may be selected to have substantially the same indices within their respective sequences J and K. For instance, in this example, both the jth and kth sets of samples are centered around the 12th sample associated with the respective sequences J and K.

The time delay determining module 408 then determines a time delay, in terms of samples of the received signal, based on the first offset $\Delta S_1$ and the second offset $\Delta S_2$. For example, the module 408 may determine the time delay by subtracting the second offset $\Delta S_2$ from the first offset $\Delta S_1$ (e.g., time delay=$\Delta S_2-\Delta S_1$). The time delay is related to the rate of the clock used to transmit the signal to the receiver 400. The timing drift measurement module 410 then determines the timing drift based on the determined time delay and an expected timing delay. For instance, the module 410 may determine the timing drift by subtracting the determined time delay from the expected time delay. The expected timing drift is related to the clock associated with the receiver 400. The receiver 400 may used the timing drift to synchronize the receiving of the data with the transmission of the data by a transmitter.

Figure 4C:
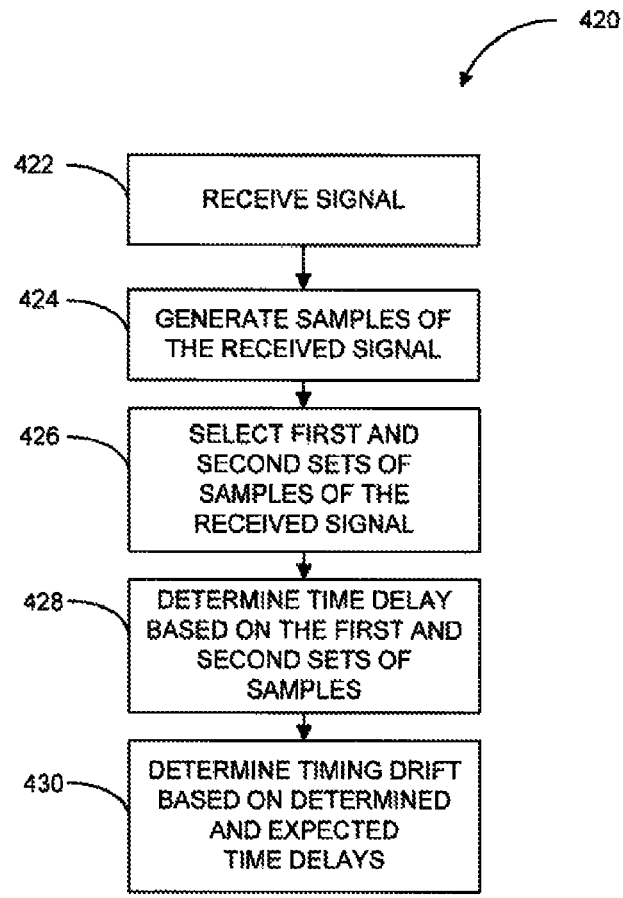
FIG. 4C illustrates a flow diagram of an exemplary method of determining timing drift in accordance with another aspect of the disclosure.

FIG. 4C illustrates a flow diagram of an exemplary method 420 of determining timing drift in accordance with another aspect of the disclosure. The method 420 may be implemented by the receiver 400 previously discussed or another type of device. According to the method 420, a signal from a remote device is received (block 422). Then, the received signal is processed to generate samples of the received signal (block 424). Then, first and second sets of samples of the received signal are selected (block 426). Then, a time delay is determined based on the first and second sets of samples (block 428). Then, a timing drift is determined based on the determined time delay and an expected time delay (block 430).

Figure 4D:
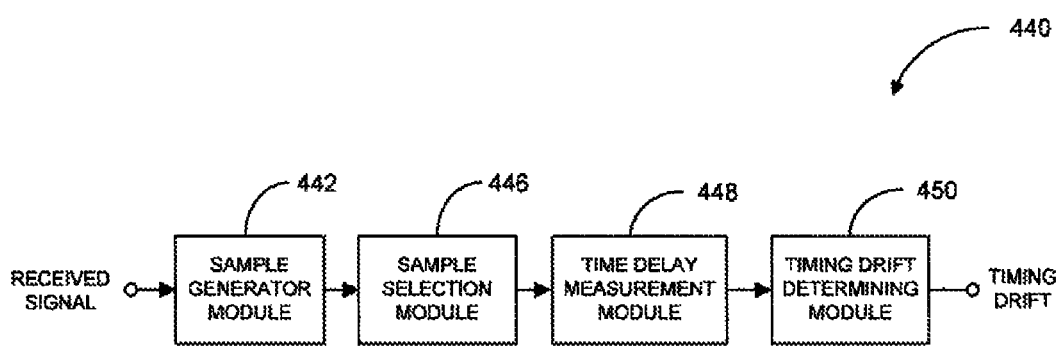
FIG. 4D illustrates a block diagram of an exemplary apparatus for determining timing drift in accordance with another aspect of the disclosure.

FIG. 4D illustrates a block diagram of an exemplary apparatus 440 for determining timing drift in accordance with another aspect of the disclosure. The apparatus 440 comprises a sample generator module 442 adapted to generate samples of a received signal. The apparatus 440 further comprises a sample selection module 446 adapted to select first and second sets of samples of the received signal. Additionally, the apparatus 440 comprises a time delay determining module 446 adapted to determine a time delay based on the first and second sets of samples. The time delay determining module 450 is adapted to determine the timing drift based on the determined time delay and an expected time delay.

Figure 5:
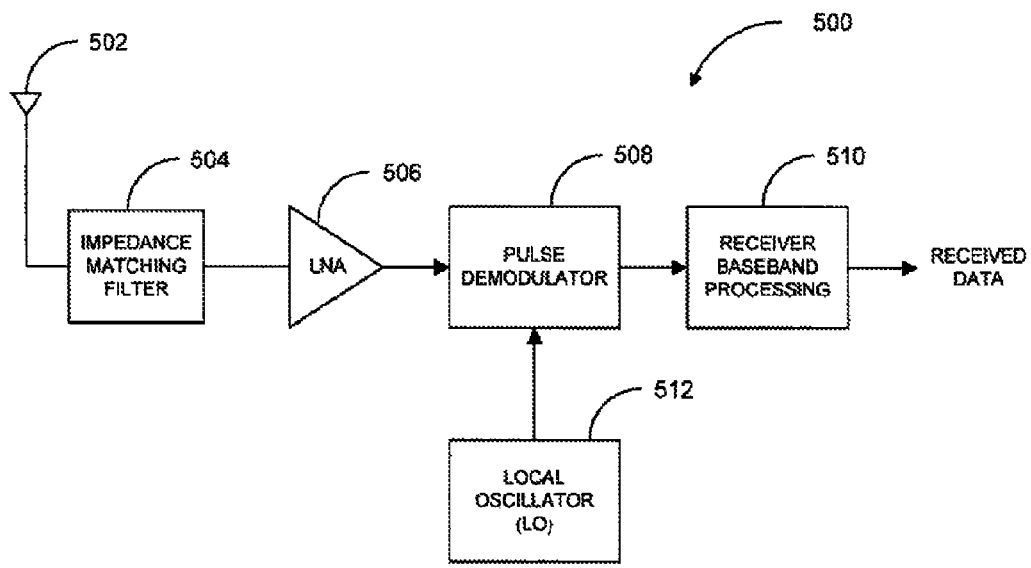
FIG. 5 illustrates a block diagram of an exemplary receiver system in accordance with another aspect of the disclosure.

FIG. 5 illustrates a block diagram of an exemplary communication device 500 in accordance with another aspect of the disclosure. The communication device 500 may be one exemplary implementation of a communication device that uses any of the apparatuses previously discussed to detect pulse sequences in the received signal and timing drift between the transmission clock and receive clock. In particular, the communication device 500 comprises an antenna 502, an impedance matching filter 504, a low noise amplifier (LNA) 506, a pulse demodulator 508, a receiver baseband processing module 510, and a local oscillator (LO) 512.

A received RF signal is picked up by the antenna 502 and applied to the LNA 506 by way of the impedance matching filter 504. The LNA 506 amplifies the received RF signal. Using the LO signal generated by the oscillator 512, the pulse demodulator 508 generates an inbound baseband signal based on the received signal. The receiver baseband processing 510 detects the one or more burst of pulses in the received signal, in order to detect one or more pulse sequences in the received signal, and timing drift between the clock used to transmit the signal and the clock used to receive the signal. A data processor (not shown) may then perform one or more defined operations based on the received data. For example, the data processor may include a microprocessor, a microcontroller, a reduced instruction set computer (RISC) processor, a display, an audio device, such as a headset, including a transducer such as speakers, a medical device, a shoe, a watch, a robotic or mechanical device responsive to the data, a user interface, such as a display, one or more light emitting diodes (LED), etc.

Figure 6A:
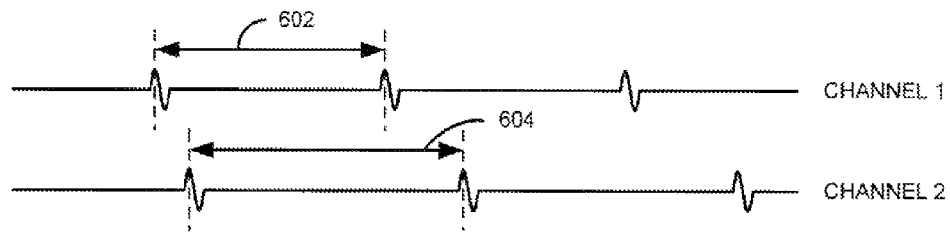
FIGS. 6A-D illustrate timing diagrams of various pulse modulation techniques in accordance with another aspect of the disclosure.

FIG. 6A illustrates different channels (channels 1 and 2) defined with different pulse repetition frequencies (PRF) as an example of a pulse modulation that may be employed in any of the communications systems, devices, and apparatuses described herein. Specifically, pulses for channel 1 have a pulse repetition frequency (PRF) corresponding to a pulse-to-pulse delay period 602. Conversely, pulses for channel 2 have a pulse repetition frequency (PRF) corresponding to a pulse-to-pulse delay period 604. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies (PRF), substantially all pulses for a given channel may be transmitted at different times than pulses for any other channel.

The pulse repetition frequency (PRF) defined for a given channel may depend on the data rate or rates supported by that channel. For example, a channel supporting very low data rates (e.g., on the order of a few kilobits per second or Kbps) may employ a corresponding low pulse repetition frequency (PRF)). Conversely, a channel supporting relatively high data rates (e.g., on the order of a several megabits per second or Mbps) may employ a correspondingly higher pulse repetition frequency (PRF).

Figure 6B:
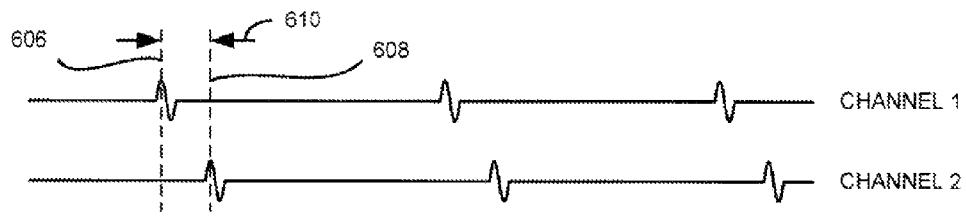

FIG. 6B illustrates different channels (channels 1 and 2) defined with different pulse positions or offsets as an example of a modulation that may be employed in any of the communications systems described herein. Pulses for channel 1 are generated at a point in time as represented by line 606 in accordance with a first pulse offset (e.g., with respect to a given point in time, not shown). Conversely, pulses for channel 2 are generated at a point in time as represented by line 608 in accordance with a second pulse offset. Given the pulse offset difference between the pulses (as represented by the arrows 610), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 6C:
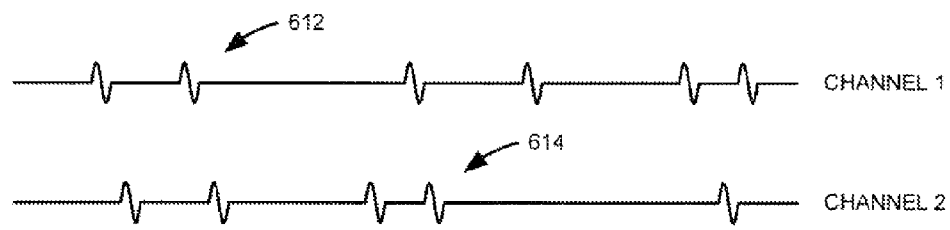

FIG. 6C illustrates different channels (channels 1 and 2) defined with different timing hopping sequences that may be employed in any of the communications systems described herein. For example, pulses 612 for channel 1 may be generated at times in accordance with one time hopping interval while pulses 614 for channel 2 may be generated at times in accordance with another time hopping interval. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

Figure 6D:
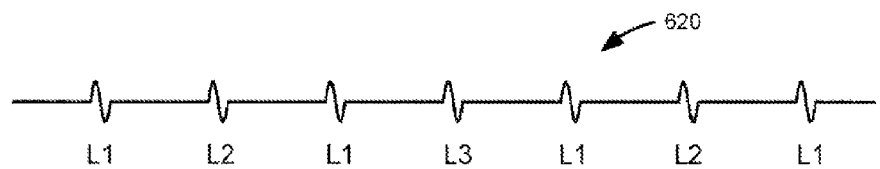

FIG. 6D illustrates different channels defined with different time slots as an example of a pulse modulation that may be employed in any of the communications systems described herein. Pulses for channel L1 are generated at particular time instances. Similarly, pulses for channel L2 are generated at other time instances. In the same manner, pulses for channel L3 are generated at still other time instances. Generally, the time instances pertaining to the different channels do not coincide or may be orthogonal to reduce or eliminate interference between the various channels.

It should be appreciated that other techniques may be used to define channels in accordance with a pulse modulation schemes. For example, a channel may be defined based on different spreading pseudo-random number sequences, or some other suitable parameter or parameters. Moreover, a channel may be defined based on a combination of two or more parameters.

Figure 7:
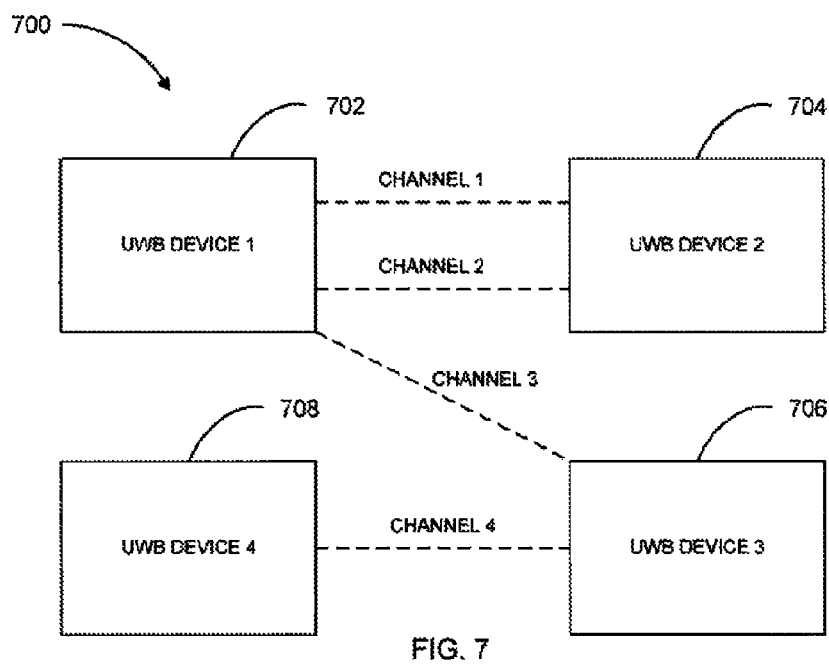
FIG. 7 illustrates a block diagram of various communication devices communicating with each other via various channels in accordance with another aspect of the disclosure.

FIG. 7 illustrates a block diagram of various ultra-wide band (UWB) communications devices communicating with each other via various channels in accordance with another aspect of the disclosure. For example, UWB device 1 702 is communicating with UWB device 2 704 via two concurrent UWB channels 1 and 2. UWB device 702 is communicating with UWB device 3 706 via a single channel 3. And, UWB device 3 706 is, in turn, communicating with UWB device 4 708 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, gaming device, or other communications devices. A medical device may include smart band-aid, sensors, vital sign monitors, and others. The communications devices described herein may be used in any type of sensing application, such as for sensing automotive, athletic, and physiological (medical) responses.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitudes of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping intervals. In some aspects concurrent channels may be established based on pulse repetition frequencies, pulse positions or offsets, and time hopping intervals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of detecting one or more pulse sequences in a first signal, comprising:
   receiving the first signal;
   generating a plurality of samples based on the first signal;
   determining a correlation of the samples with a second signal based on a reference sequence, wherein the second signal comprises asserted windows based on one more parameters determined, each having a width spanning a plurality of the generated samples; and
   detecting the one or more pulse sequences based on the correlation.

2. The method of claim 1, wherein determining the correlation comprises performing a circular convolution of the samples with the second signal.

3. The method of claim 1, wherein the asserted windows are arranged in substantially the same manner as pulses of the one or more pulse sequences in the first signal.

4. The method of claim 1, further comprising setting the width of each asserted window of the second signal based on at least one characteristic of the first signal.

5. The method of claim 1, further comprising setting the width of each asserted window of the second signal based on a timing drift between a first clock associated with a transmission of the first signal and a second clock associated with the reception of the first signal.

6. The method of claim 1, further comprising setting the width of each asserted window of the second signal based on a jitter of a clock associated with the reception of the first signal.

7. The method of claim 1, further comprising determining a timing drift associated with the first signal, wherein the timing drift is used for synchronization with the first signal.

8. The method of claim 1, wherein the one or more pulse sequences in the first signal comprise a pulse sequence repeated one or more times.

9. A method of detecting one or more pulse sequences in a first signal, comprising:
   receiving the first signal;
   generating a plurality of samples based on the first signal;
   determining a correlation of the samples with a second signal based on a reference sequence, wherein determining the correlation of the samples with the second signal comprises:

determining a first sample from the plurality of generated samples that is associated with a pulse of one or more pulse sequences in the first signal; and correlating samples from the plurality of generated samples with the second signal based substantially on one or more lengths of a time hopping interval associated with the first signal and the first sample; and detecting the one or more pulse sequences based on the correlation.

10. The method of claim 9, further comprising:
selecting a second sample from the plurality of generated samples; and
determining an offset between the first sample and the second sample;
wherein correlating samples from the plurality of generated samples with the second signal is based on the offset.

11. The method of claim 10, wherein correlating samples from the plurality of generated samples with the second signal comprises correlating samples that are substantially the offset plus one or more lengths of the time hopping interval from the second sample.

12. The method of claim 9, wherein correlating samples from the plurality of generated samples with the second signal comprises correlating other samples from the plurality of generated samples based on substantially one or more lengths of the time hopping interval and a second sample distinct from the first sample.

13. A method of detecting one or more pulse sequences in a first signal, comprising:
receiving the first signal;
generating a plurality of samples based on the first signal;
determining a correlation of the samples with a second signal based on a reference sequence, wherein determining the correlation of the samples with the second signal comprises:
determining samples from the plurality of generated samples that are associated with one or more non-restricted time hopping intervals within a half pulse interval associated with the first signal that comprises one or more restricted time hopping intervals; and
correlating samples from the plurality of generated samples with the second signal based on one or more lengths of the half pulse interval and the determined samples; and
detecting the one or more pulse sequences based on the correlation.

14. The method of claim 13, wherein determining samples associated with one or more non-restricted time hopping intervals comprises:
selecting a reference sample from the plurality of generated samples;
determining one or more offsets based on the reference sample and samples associated with the one or more restricted time hopping intervals, respectively; and
determining samples that are not associated with the one or more offsets.

15. The method of claim 13, wherein determining samples associated with one or more non-restricted time hopping intervals comprises:
selecting a reference sample from the plurality of generated samples;
determining one or more offsets based on the reference sample and samples associated with the one or more non-restricted time hopping intervals, respectively; and
determining samples that are associated with the one or more offsets.

16. A method of detecting one or more pulse sequences in a first signal, comprising:
receiving the first signal;
generating a plurality of samples based on the first signal;
determining a correlation of the samples with a second signal based on a reference sequence;
detecting the one or more pulse sequences based on the correlation; and
determining a timing drift associated with the first signal, wherein the timing drift is used for synchronization with the first signal, and wherein determining the timing drift associated with the first signal comprises:
selecting a first set of samples from the plurality of generated samples;
selecting a second set of samples from the plurality of generated samples;
determining a time delay based on the first and second sets of samples; and
determining the timing drift based on the determined time delay and an expected time delay.

17. The method of claim 16, wherein the first and second sets of samples are associated with first and second pulse sequences in the first signal, respectively.

18. The method of claim 17, wherein the first and second sets of samples have substantially the same indices within the first and second pulse sequences, respectively.

19. The method of claim 16, wherein the expected time delay is based on a clock signal associated with the reception of the first signal.

20. The method of claim 16, wherein determining the time delay comprises:
selecting a reference sample from the plurality of generated samples;
determining a first offset based on the reference sample and the first set of samples; and
determining a second offset based on the reference sample and the second set of samples, wherein the time delay between the first and second sets of samples is determined based on the first and second offsets.

21. An apparatus for detecting one or more pulse sequences in a first signal, comprising:
an RF circuit adapted to receive the first signal;
a sample generator circuit adapted to generate a plurality of samples based on the first signal;
a correlation circuit adapted to perform a correlation of the samples with a second signal based on a reference sequence, wherein the second signal comprises asserted windows based on one more parameters determined, each having a width spanning a plurality of generated samples; and
a pulse sequence detection circuit adapted to detect the one or more pulse sequences based on the correlation.

22. The apparatus of claim 21, wherein the correlation circuit comprises a circular convolution circuit adapted to perform a circular convolution of the samples with the second signal.

23. The apparatus of claim 21, wherein the asserted windows are arranged in substantially the same as pulses of the one or more pulse sequences in the first signal.

24. The apparatus of claim 21, further comprising a second signal generator adapted to generate the second signal and to set the width of each asserted window based on at least one characteristic of the first signal.

25. The apparatus of claim 21, further comprising a second signal generator adapted to generate the second signal and to set the width of each asserted window based on a timing drift between a first clock associated with a transmission of the first signal and a second clock associated with the reception of the first signal.

26. The apparatus of claim 21, further comprising a second signal generator adapted to generate the second signal and to set the width of each asserted window based on a jitter of a clock associated with the reception of the first signal.

27. The apparatus of claim 21, further comprising a timing drift determining circuit adapted to determine a timing drift associated with the first signal, wherein the timing drift is used for synchronization with the first signal.

28. The apparatus of claim 21, wherein the one or more pulse sequences in the first signal comprise a pulse sequence repeated one or more times.

29. An apparatus for detecting one or more pulse sequences in a first signal, comprising:
   an RF circuit adapted to receive the first signal;
   a sample generator circuit adapted to generate a plurality of samples based on the first signal;
   a correlation circuit adapted to perform a correlation of the samples with a second signal based on a reference sequence;
   a sample determining circuit adapted to determine a first sample from the generated samples that is associated with a pulse of one or more pulse sequences in the first signal;
   wherein the correlation circuit is adapted to correlate samples from the plurality of generated samples with the second signal based substantially on one or more lengths of a time hopping interval associated with the first signal and the first sample; and
   a pulse sequence detection circuit adapted to detect the one or more pulse sequences based on the correlation.

30. The apparatus of claim 29, wherein the correlation circuit is adapted to correlate the plurality of generated samples with the second signal by correlating samples from the plurality of generated samples with the second signal based on an offset between the first sample and a second sample.

31. The apparatus of claim 30, wherein the correlation circuit is adapted to correlate samples with the second signal that are substantially the offset plus one or more lengths of the time hopping interval from the second sample.

32. The apparatus of claim 29, wherein the correlation circuit is adapted to correlate other samples from the plurality of generated samples with the second signal based on substantially one or more lengths of the time hopping interval and a second sample distinct from the first sample.

33. An apparatus for detecting one or more pulse sequences in a first signal, comprising:
   an RF circuit adapted to receive the first signal;
   a sample generator circuit adapted to generate a plurality of samples based on the first signal;
   a correlation circuit adapted to perform a correlation of the samples with a second signal based on a reference sequence;
   a pulse sequence detection circuit adapted to detect the one or more pulse sequences based on the correlation; and
   a sample determining circuit adapted to determine samples from the plurality of generated samples that are associated with one or more non-restricted time hopping intervals within a half pulse interval associated with the first signal that comprises one or more restricted hopping intervals;
   wherein the correlation circuit is adapted to correlate samples from the plurality of generated samples with the second signal based on substantially one or more lengths of the half pulse interval and the determined samples.

34. The apparatus of claim 33, wherein the sample determining circuit is adapted to determine samples associated with one or more non-restricted time hopping intervals by:
   selecting a reference sample from the plurality of generated samples;
   determining one or more offsets between the reference sample and the samples associated with the one or more restricted time hopping intervals, respectively; and
   determining samples associated with one or more non-restricted time hopping intervals by selecting samples not associated with the one or more offsets.

35. The apparatus of claim 33, wherein the sample determining circuit is adapted to select samples associated with one or more non-restricted time hopping intervals by:
   selecting a reference sample from the plurality of generated samples;
   determining one or more offsets between the reference sample and the samples associated with the one or more non-restricted time hopping intervals, respectively; and
   determining samples associated with one or more non-restricted time hopping intervals by selecting samples associated with the one or more offsets.

36. An apparatus for detecting one or more pulse sequences in a first signal, comprising:
   an RF circuit adapted to receive the first signal;
   a sample generator circuit adapted to generate a plurality of samples based on the first signal;
   a correlation circuit adapted to perform a correlation of the samples with a second signal based on a reference sequence;
   a pulse sequence detection circuit adapted to detect the one or more pulse sequences based on the correlation; and
   a timing drift determining circuit adapted to determine a timing drift associated with the first signal, wherein the timing drift is used for synchronization with the first signal, and wherein the timing drift determining circuit comprises:
   a time delay determining circuit adapted to:
      select a first set of samples from the plurality of generated samples;
      select a second set of samples from the plurality of generated samples; and
      determine a time delay based on the first and second sets of samples; and
   a timing drift calculation circuit adapted to calculate the timing drift based on the determined time delay and an expected time delay.

37. The apparatus of claim 36, wherein the first and second sets of samples are associated with first and second pulse sequences in the first signal, respectively.

38. The apparatus of claim 37, wherein the first and second sets of samples have substantially the same indices within the first and second pulse sequences, respectively.

39. The apparatus of claim 36, wherein the time delay determining circuit is further adapted to:
   select a reference sample from the plurality of generated samples;
   determine a first offset based on the reference sample and the first set of samples; and
   determine a second offset based on the reference sample and the second set of samples, wherein the time delay is based on the first and second offsets.

40. The apparatus of claim 36, wherein the expected time delay is based on a clock signal associated with the reception of the first signal.

41. An apparatus for detecting one or more pulse sequences in a first signal, comprising:
means for receiving the first signal;
means for generating a plurality of samples based on the first signal;
means for performing a correlation of the samples with a second signal based on a reference sequence, wherein the second signal comprises asserted windows based on one more parameters determined, each having a width spanning a plurality of the generated samples; and
means for detecting the one or more pulse sequences based on the correlation.

42. The apparatus of claim 41, wherein the correlation means comprises means for performing a circular convolution of the samples with the second signal.

43. The apparatus of claim 41, wherein the asserted windows are arranged in substantially the same manner as pulses of the one or more pulse sequences in the first signal.

44. The apparatus of claim 41, wherein the second signal generating means is adapted to generate the second signal and set the width of each asserted window of the second signal based on at least one characteristic of the first signal.

45. The apparatus of claim 41, wherein the second signal generating means is adapted to generate the second signal and set the width of each asserted window of the second signal based on a timing drift between a first clock associated with a transmission of the first signal and a second clock associated with the reception of the first signal.

46. The apparatus of claim 41, wherein the second signal generating means is adapted to generate the second signal and set the width of each asserted window of the second signal based on a jitter of a clock associated with the reception of the first signal.

47. The apparatus of claim 41, further comprising means for determining a timing drift associated with the first signal, wherein the timing drift is used for synchronization with the received signal.

48. The apparatus of claim 41, wherein the one or more pulse sequences in the first signal comprise a pulse sequence repeated one or more times.

49. An apparatus for detecting one or more pulse sequences in a first signal, comprising:
means for receiving the first signal;
means for generating a plurality of samples based on the first signal;
means for performing a correlation of the samples with a second signal based on a reference sequence, wherein the correlation means comprises:
means for determining a first sample from the plurality of generated samples that is associated with a pulse of the pulse sequence in the first signal; and
means for correlating samples from the plurality of generated samples with the second signal based substantially on one or more lengths of a time hopping interval associated with the first signal and the first sample; and
means for detecting the one or more pulse sequences based on the correlation.

50. The apparatus of claim 49, further comprising:
means for selecting a second sample from the plurality of generated samples; and
means for determining an offset between the first sample and the second sample;
wherein the correlating means is adapted to correlate samples from the plurality of generated samples with the second signal based on the offset.

51. The apparatus of claim 50, wherein the correlating means is adapted to correlate samples with the second signal that are substantially the offset plus one or more lengths of the time hopping interval from the second sample.

52. The apparatus of claim 49, wherein the correlating means is further adapted to correlate samples from the plurality of generated samples with the second signal based on substantially one or more lengths of the time hopping interval and a second sample distinct from the first sample.

53. An apparatus for detecting one or more pulse sequences in a first signal, comprising:
means for receiving the first signal;
means for generating a plurality of samples based on the first signal;
means for performing a correlation of the samples with a second signal based on a reference sequence;
means for determining samples from the plurality of generated samples that are associated with one or more non-restricted time hopping intervals within a half pulse interval associated with the first signal that comprises one or more restricted time hopping intervals; and
wherein the correlation means is adapted to correlate samples from the plurality of generated samples with the second signal based on one or more lengths of the half pulse interval and the determined samples; and
means for detecting the one or more pulse sequences based on the correlation.

54. The apparatus of claim 53, wherein said means for determining samples comprises:
means for selecting a reference sample from the plurality of generated samples;
means for determining one or more offsets based on the reference sample and samples associated with the one or more restricted time hopping intervals, respectively; and
means for determining samples that are not associated with the one or more offsets.

55. The apparatus of claim 53, wherein said means for determining samples comprises:
means for selecting a reference sample from the plurality of generated samples;
means for determining one or more offsets based on the reference sample and samples associated with the one or more non-restricted time hopping intervals, respectively; and
means for determining samples that are associated with the one or more offsets.

56. An apparatus for detecting one or more pulse sequences in a first signal, comprising:
means for receiving the first signal;
means for generating a plurality of samples based on the first signal;
means for performing a correlation of the samples with a second signal based on a reference sequence;
means for detecting the one or more pulse sequences based on the correlation;
means for determining a timing drift associated with the first signal, wherein the timing drift is used for synchronization with the received signal, and wherein the timing drift determining means comprises:
means for selecting a first set of samples from the plurality of generated samples;
means for selecting a second set of samples from the plurality of generated samples;
means for determining a time delay based on the first and second sets of samples; and
means for determining the timing drift based on the determined time delay and an expected time delay.

57. The apparatus of claim 56, wherein the first and second sets of samples are associated with first and second pulse sequences in the received signal, respectively.

58. The apparatus of claim 57, wherein the first and second sets of samples have substantially the same indices within the first and second pulse sequences, respectively.

59. The apparatus of claim 56, wherein the time delay determining means comprises:
   means for selecting a reference sample from the plurality of generated samples;
   means for determining a first offset based on the reference sample and the first set of samples; and
   means for determining a second offset based on the reference sample and the second set of samples, wherein the time delay determining means is adapted to determine the time delay based on the first and second offsets.

60. The apparatus of claim 56, wherein the expected time delay is based on a clock signal associated with the reception of the first signal.

61. A computer program product, comprising:
   a computer readable storage device comprising instructions executable by an apparatus to:
   receive a first signal;
   generate a plurality of samples based on the first signal;
   determine a correlation of the samples with a second signal based on a reference sequence, wherein the second signal comprises asserted windows based on one more parameters determined, each having a width spanning a plurality of the generated samples; and
   detect one or more pulse sequences in the first signal based on the correlation.

\* \* \* \* \*